E. FERRISS.
WHEEL.
APPLICATION FILED NOV. 16, 1914.

1,156,676. Patented Oct. 12, 1915.

Witnesses.
A. H. Opsahl.
E. C. Skinkle

Inventor.
Edward Ferriss.
By his Attorneys
Williamson Merchant

UNITED STATES PATENT OFFICE.

EDWARD FERRISS, OF MINNEAPOLIS, MINNESOTA, ASSIGNOR TO WILLIAM SCHWAB, OF MINNEAPOLIS, MINNESOTA.

WHEEL.

1,156,676.  Specification of Letters Patent.  Patented Oct. 12, 1915.

Application filed November 16, 1914. Serial No. 872,276.

*To all whom it may concern:*

Be it known that I, EDWARD FERRISS, a citizen of the United States, residing at Minneapolis, in the county of Hennepin and State of Minnesota, have invented certain new and useful Improvements in Wheels; and I do hereby declare the following to be a full, clear, and exact description of the invention, such as will enable others skilled in the art to which it appertains to make and use the same.

My invention has for its object to provide an improved wheel especially adapted for use on tractors, or other vehicles, to be used on soft ground.

Generally stated, the invention consists of the novel construction and arrangement of parts hereinafter described and defined in the claims.

The invention is illustrated in the accompanying drawings wherein like characters indicate like parts throughout the several views.

Figure 1:
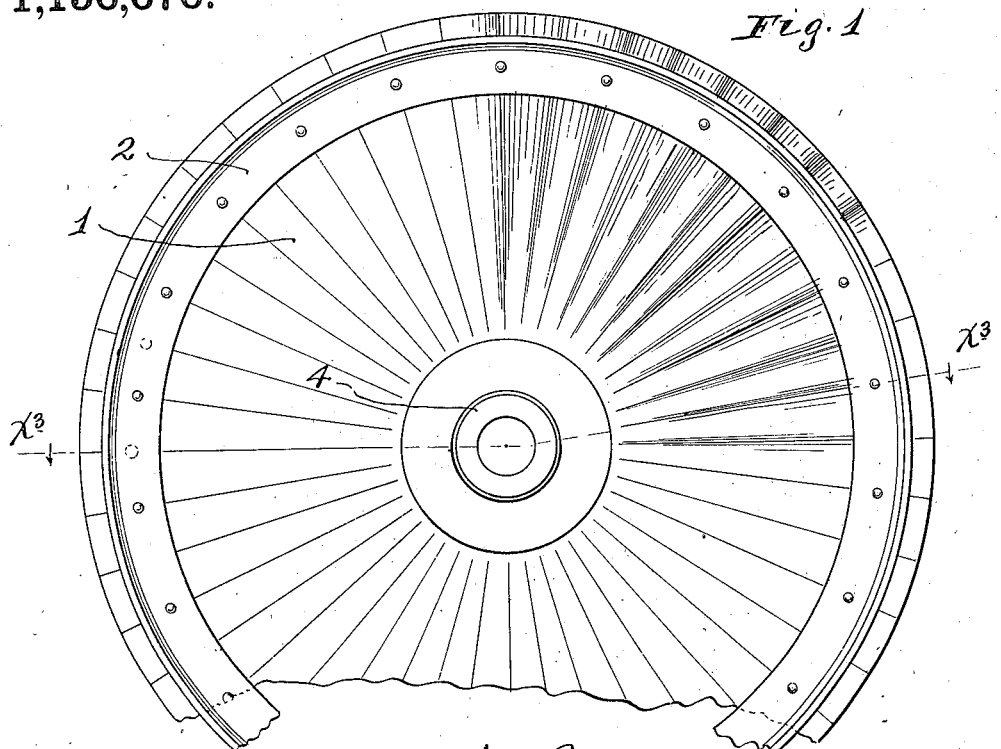
Figure 2:
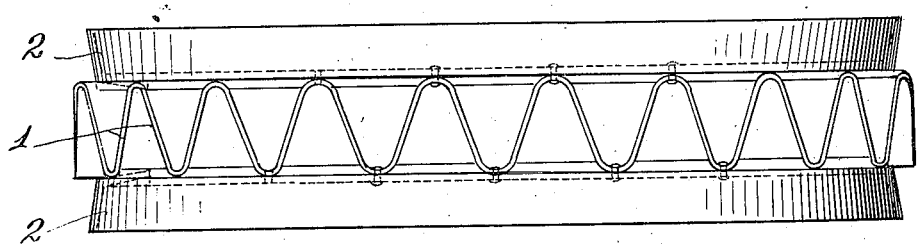
Figure 3:
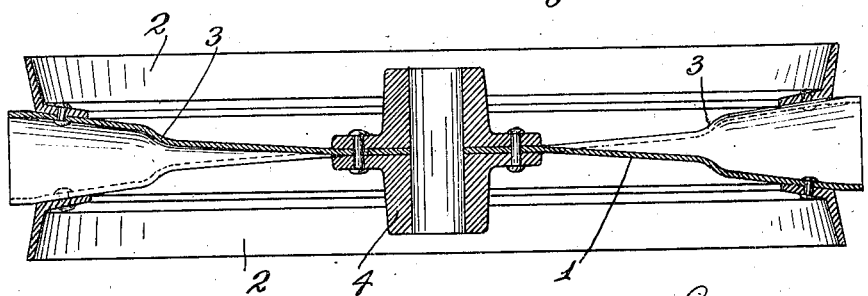

Referring to the drawings: Figure 1 is a side elevation of the improved wheel with some parts broken away; Fig 2 is a plan view of the wheel; and Fig. 3 is a section taken on the line $x^3$ $x^3$ on Fig. 1.

The wheel is made up of three main elements, to-wit, a sheet steel or other sheet metal web 1, and laterally spaced tread flanges 2. The web 1 is circumferentially corrugated, and these corrugations extend radially toward the axis or hub of the wheel, and dimish in depth in that direction. The tread flanges 2 are preferably formed by rings that are angular in cross section and have their vertical flanges riveted directly to the contacting portions of the corrugated outer edge or periphery of the corrugated web 1. Furthermore, this corrugated web projects radially outward considerably beyond the tread faces of the tread flanges 2. The tread faces of the said flanges 2 preferably diverge outwardly, or in other words, incline inward or toward each other, so that they have a tendency to crowd dirt toward the corrugations of the said web. The corrugations will enter the ground, and hence, adapt the wheel especially for use as a traction wheel. The corrugations cannot become filled or clogged with dirt as the dirt will be worked constantly upward through the corrugations and between the tread flanges. At points radially inward of the tread flanges 2, the corrugations have obliquely offset shoulders 3. When the dirt crowded upward in the corrugations strike these shoulders 3, it will be deflected and caused to drop from the web. The corrugations also serve to very greatly strengthen the web. At the axis of the web there is a perforation that alines with the axle passages of the hub members 4, which hub members have flanges rigidly secured to the web by rivets, or otherwise.

The wheel described, can be cheaply constructed and is strong, durable and efficient for the purposes had in view. It is especially adapted for use on tractors but may be put to many other uses.

What I claim is:

1. A wheel comprising a web and laterally spaced tread flanges, the former having a circumferentially corrugated outer portion to which the said tread flanges are rigidly secured.

2. A wheel comprising a web and laterally spaced tread flanges, the former having a circumferentially corrugated outer portion to which the said tread flanges are rigidly secured, the said corrugations extending radially between said tread flanges and forming openings through which the dirt may crowd upward between said flanges.

3. A wheel comprising a web and laterally spaced tread flanges, the former having a circumferentially corrugated outer portion to which the said tread flanges are rigidly secured, the said corrugations extending radially between said tread flanges and forming openings through which the dirt may crowd upward between said flanges, and the said corrugations radially inward of said flanges having obliquely offset shoulders serving to clear the said web of the inwardly crowded dirt.

4. A wheel comprising a web and laterally spaced tread flanges, the former having a circumferentially corrugated outer portion to which the said tread flanges are rigidly secured, and the tread faces of which flanges diverge outwardly.

5. A wheel comprising a web and laterally spaced tread flanges, the former having a circumferentially corrugated outer portion to which the said tread flanges are rigidly secured, the corrugated outer edge of said web projecting materially beyond said tread flanges.

6. A wheel comprising a web and laterally spaced tread flanges, the former having a circumferentially corrugated outer portion to which the said tread flanges are rigidly secured, the corrugated outer edge of said web projecting materially beyond said tread flanges, and the tread faces of which flanges diverge outwardly.

7. A wheel comprising a web and laterally spaced tread flanges, the former having a circumferentially corrugated outer portion to which the said tread flanges are rigidly secured, the said web having an axial hub, the corrugated outer edge of said web projecting materially outward beyond said tread flanges, and the said corrugations in a radial direction diminishing in depth toward said hub.

8. A wheel comprising a web and laterally spaced tread flanges, the former having a circumferentially corrugated outer portion to which the said tread flanges are rigidly secured, the said web having an axial hub, the corrugated outer edge of said web projecting materially outward beyond said tread flanges, and the said corrugations in a radial direction diminishing in depth toward said hub, and having at their intermediate portions, at points inward of said tread flanges, oblique offset shoulders for assisting in clearing said web of dirt.

In testimony whereof I affix my signature in presence of two witnesses.

EDWARD FERRISS.

Witnesses:
HARRY D. KILGORE,
F. D. MERCHANT.